United States Patent [19]

Kern

[11] 3,850,687

[45] Nov. 26, 1974

[54] METHOD OF DENSIFYING SILICATE GLASSES

[75] Inventor: Werner Kern, Belle Mead, N.J.

[73] Assignee: RCA Corporation, New York, N.Y.

[22] Filed: May 26, 1971

[21] Appl. No.: 146,866

[52] U.S. Cl. ................. 117/217, 117/201, 117/215, 117/106 R, 117/169 A

[51] Int. Cl. ................. B44d 1/14

[58] Field of Search ......... 317/235 AG, 235, 234 F; 29/588; 117/201, 106 R, 106 A, 217, 215, 169 A

[56] References Cited

UNITED STATES PATENTS

| | | | |
|---|---|---|---|
| 3,440,496 | 4/1969 | Saia et al. | 317/234 F |
| 3,481,781 | 12/1969 | Kern | 117/106 R |
| 3,620,837 | 11/1971 | Leff | 117/217 |

FOREIGN PATENTS OR APPLICATIONS

| | | | |
|---|---|---|---|
| 1,177,320 | 1/1970 | Great Britain | 317/235 |

*Primary Examiner*—Cameron K. Weiffenbach
*Attorney, Agent, or Firm*—G. H. Bruestle; W. S. Hill; P. J. Van Tricht

[57] ABSTRACT

A method of densifying a layer of a silicate glass that has been deposited on a substrate as a layer from the vapor phase, comprising heating the glass layer at a temperature of the order of about 400° to 450° C in an atmosphere of water vapor.

7 Claims, 1 Drawing Figure

ETCH RATE VS DENSIFICATION TIME AT 450°C. IN VARIOUS AMBIENTS

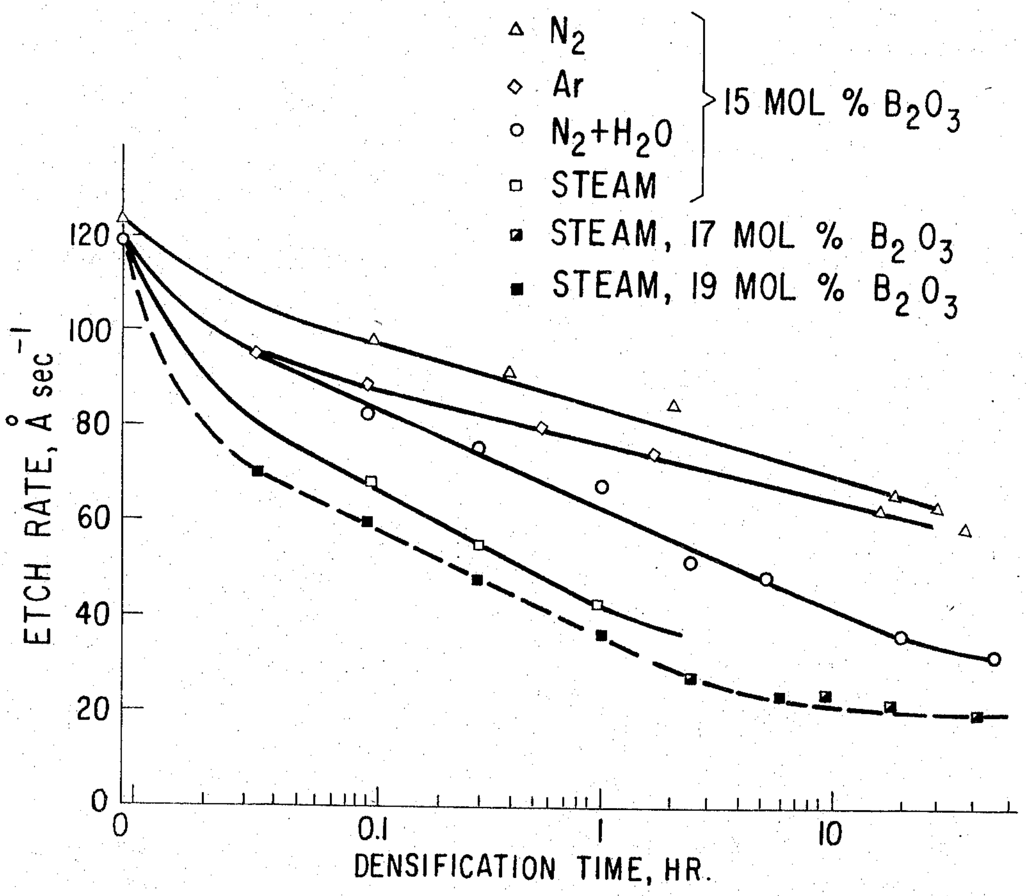
ETCH RATE VS DENSIFICATION TIME AT 450°C.
IN VARIOUS AMBIENTS
INVENTOR.
WERNER KERN
BY
W. S. Hill
AGENT

METHOD OF DENSIFYING SILICATE GLASSES

BACKGROUND OF THE INVENTION

In the manufacture of semiconductor devices such as diodes, transistors, integrated circuits and the like, it is usually necessary to provide protection against contaminants, including moisture, in the ambient since these have a deleterious influence on the operation of the devices. In the case of silicon devices it is customary to provide a passivating coating of silicon dioxide, or silicon nitride over the surface to be protected.

However, silicon dioxide and silicon nitride are not adequate, by themselves, to completely protect a semiconductor device over a long period of time from the undesirable effects of contaminants since these can slowly diffuse through the passivating coating and attack the surface of the semiconductor. Furthermore, there are contact openings in the passivating coating that are particularly susceptible to the admission of contaminants from the ambient.

Because of the inadequate protection afforded by the passivating coating, devices are usually either enclosed in hermetically sealed cans or encapsulated in synthetic resins. But these protective means also have disadvantages. Metal cans are relatively expensive and so bulky that the advantage of small size provided by semiconductor device and integrated circuit technology, is lost. And, in the case of resinous encapsulants, it is well known that these are not completely impervious to moisture. Over a period of time, moisture often diffuses through the encapsulant and degrades the device.

It has been previously recognized that silicate glasses can solve most of these encapsulation problems. A coating of glass adds very little bulk to a semiconductor device yet it provides a degree of mechanical protection and is relatively impervious to moisture and other contaminants.

Silicate glasses are usually deposited on semiconductor device surfaces by vapor phase reactions. As deposited from the vapor phase, the glasses are not dense and impervious enough to provide good device stability. However, it has previously been found possible to densify these glasses sufficiently by heating them in ambients such as pure nitrogen at about 800° C for about 15 minutes.

Silicon devices usually have electrode contacts and other conductors made of aluminum and it is sometimes necessary to deposit the aluminum contacts before the glass layer is applied. Since a silicon-aluminum eutectic forms at relatively low temperatures, these devices cannot be safely heated much beyond 450° C for prolonged periods of time. Therefore, at temperatures previously required to densify the glasses, device characteristics have been affected severly where the devices have aluminum contacts.

OBJECTS OF THE INVENTION

One object of the invention is to provide an improved method of densifying vapor deposited layers of silicate glasses.

Another object of the invention is to provide an improved method of encapsulating a semiconductor device with a silicate glass.

INVENTION SUMMARY

The above objects are achieved by heating a device including a silicate glass protective layer at a temperature of about 400° to 450° C in an atmosphere of steam or water vapor, for several hours. The increased density is indicated by a substantial decrease in the chemical etch rate.

THE DRAWING

The single FIGURE of the drawing is a graph of etch rate vs densification time at 450° C for several different glass compositions in various atmospheres.

DESCRIPTION OF PREFERRED EMBODIMENT

Although the invention can be applied to any object coated with a vapor deposited silicate glass film, it is of particular advantage in connection with manufacture of silicon bipolar transistors having aluminum electrode contacts. A typical bipolar transistor may comprise a silicon chip of N type conductivity having a diffused P type base region and one or more diffused N type emitter regions within the base region. The transistor may have at least base and emitter contacts of vacuum deposited aluminum on a major surface of the chip and a collector contact of aluminum on the opposite major surface of the chip. Alternatively, the device may have all three contacts on the same surface of the chip. The latter arrangement is preferred when the chip is to be either "flip-chip" mounted or "beam lead" mounted on a hybrid type integrated circuit which includes a pattern of printed metallic conductors on an insulating substrate.

The principle of the invention is applicable to silicate glass films deposited by a variety of vapor deposition methods, such as chemical vapor deposition, sputtering, and glow-discharge reactions.

The invention will be illustrated in connection with encapsulating an NPN bipolar transistor with a borosilicate glass. A complete description of a process of synthesizing and deposition of borosilicate glasses, as well as glasses such as other silicate glasses by decomposition and oxidation of the hydrides of the constituents can be found in U.S. Pat. No. 3,481,781 to Werner Kern, issued Dec. 2, 1969 and assigned to RCA Corporation. Briefly, the process includes the steps of:

1. Placing the device to be coated into a reaction zone and heating it to a predetermined temperature, and then 2. introducing the reactants in gaseous form, in an inert carrier gas, into the reaction zone where they are oxidized and deposited on the surface of the device.

Assuming that the transistor to be coated has aluminum electrode contacts, it should be heated to the deposition temperature in the absence of oxygen to prevent the aluminum from oxidizing. Second, the reactants should be introduced into the reaction chamber in the correct sequence, to avoid the formation of oxygen-deficient films.

The deposition system is first brought up to a temperature of about 400° C. Nitrogen is then admitted to the deposition chamber and the transistor is placed on a holder within the chamber.

Next, silane flow is started and the oxygen flow is begun. A layer of silicon dioxide is preferably deposited on the device surface before the glass layer is applied to protect the aluminum metallization. Silane anad oxygen, alone, are therefore continued for a time sufficient to form a layer of silicon dioxide about 500 to 2,000 Angstroms in thickness. Alternatively, a layer of silicon nitride can be deposited by well known techniques.

Then the borosilicate glass is deposited by adding diborane to the gaseous mixture as explained in U.S. Pat. No. 3,481,781.

Thickness of the coating may vary but about 1–5 micrometers gives adequate device protection when treated as described below in accordance with this invention.

In order to obtain stable films and adequate device protection it was previously found that glass deposited at these low temperatures should be densified. This was done, previously, when aluminum contacts were not present, by heating at a temperature of, typically, 800° C in pure nitrogen for about 15 minutes. However, when aluminum contacts are present, at this temperature, the transistor is ruined.

In accordance with the present invention, it has now been found that if the densification is carried out in an atmosphere of steam or water vapor, temperature can be lowered to about 400° to 450°C. The time of treatment is of the order of several hours.

In order to demonstrate the improvement in densification results achievable in the present invention, glass-coated devices were heat-treated in different dry and moist atmospheres for the same lengths of time and at the same temperature and then etched with the same etching composition in order to compare etching rates. Etching rate is a measure of density of the glass being etched. The denser the glass is, the slower the etching rate.

The etching composition used consisted of 1.5 vols. 49 percent concentrated HF, 1.0 vols. 70 percent concentrated $HNO_3$ and 30 vols. deionized water.

The FIGURE presents plots of the etch rate of typical borosilicate glass compositions as a function of the log of densification time at 450° C. Glass compositions having 15–19 mol percent $B_2O_3$ were used but preferred glasses may contain 15–20 mol percent $B_2O_3$. The etch rate of the films as deposited at 400° C is indicated on the time-zero line. The initial decreases taking place within the first 2 minutes are due primarily to the annealing of lattice stresses introduced during film deposition. The etch rates then decrease proportionally to the log of densification time. The slope of each curve is a characteristic function of the ambient.

For each type of ambient the relative magnitude of the etch rate at any given time on the logarithmic curve depends upon the glass composition, as can be seen by comparing the 2 lower curves with each other. These 2 curves show densification of 2 different borosilicate glasses in steam.

The curves also show that water vapor accelerates the densification process greatly. The 3 curves for the wet ambients are seen to level off and approach a constant etch rate for increasing heat treating time. Constancy of etch rate signifies that the glass is completely densified. This was experimentally verified by heating the samples from last data points of the curves shown to 900° C. The resulting etch rates corresponded to the levels indicated by the curves.

The heating time required to achieve nearly complete densification of a given glass composition can be estimated by extrapolating the logarithmic curve for a given ambient and temperature to its intercept with the final level base line. Densification periods for the 15 mol percent $B_2O_3$ composition are: 3 hours for steam, 33 hours for wet nitrogen, and 25,000 hours for dry argon. The time for complete densification is longer than estimated from the intercept because of the decrease of the slope as the terminal level is being approached. Of course shorter times may be used if less than complete densification is desired.

Water vapor also accelerates the densification of silicate glasses at temperatures higher than 450° C. But the acceleration is less as temperature rises since the temperature effect overrides the water vapor effect.

Planar silicon transistor wafers of the 2N3261 type were processed with deposited silicon dioxide, metallized with aluminum and vapor-glassed with 5 microns of a borosilicate glass. Top and bottom layers of silicon dioxide having a thickness of 2,000 Angstroms were used. Densification was carried out in steam at 450° C for 24 hours. The glass was then pattern-etched with glycerol-hydrofluoric acid etch, using a thick layer of photoresist, to expose the peripheral bonding pads of the aluminum metallization. The devices were free of visual flaws and had electrical characteristics that could not be distinguished from aluminum metallized comparison devices that had not been glassed or heat treated.

Although etch rate data has been given only for simple borosilicate glasses, a similar effect has been found for aluminaborosilicate and zinc borosilicate glasses.

I claim:

1. A process comprising vapor-depositing a layer of a borosilicate glass on a substrate and then heating said layer in an atmosphere of water vapor at a temperature of the order of about 400° to 450° C for a time sufficient to appreciably densify said layer.

2. A process according to claim 1 in which said glass is deposited from a vapor phase reaction using a mixture of diborane, silane and oxygen.

3. A process according to claim 2 in which said glass is a layer about 1 to 5 micrometers thick.

4. A process according to claim 3 in which said glass contains about 15–20 mol percent $B_2O_3$ and said heating time is at least 3 hours.

5. A process of protecting a semiconductor device which comprises a semiconductor body having a PN junction exposed at a surface thereof and having aluminum contact pads on said surface, comprising depositing a layer of silicon dioxide or silicon nitride on said surface and over said junction, depositing a layer of a borosilicate glass on said silicon dioxide layer by a vapor deposition method, and then densifying said glass by heating it to a temperature of the order of 400° to 450° C in an atmosphere of steam for a time sufficient to materially decrease the etching rate in hydrofluoric acid.

6. A process according to claim 5 in which said glass is borosilicate glass deposited by reacting silane, diborane and oxygen.

7. A process according to claim 6 in which said glass layer is about 1–5 micrometers thick.

* * * * *

Disclaimer 3,850,687.—*Werner Kern*, Belle Mead, N.J. METHOD OF DENSIFYING SILICATE GLASSES. Patent dated Nov. 26, 1974. Disclaimer filed Mar. 1, 1978, by the assignee, *RCA Corporation*.

Hereby enters this disclaimer to claims 1 through 7 of said patent.

[*Official Gazette April 18, 1978.*]